(12) United States Patent
Pan et al.

(10) Patent No.: US 6,947,887 B2
(45) Date of Patent: Sep. 20, 2005

(54) LOW SPEED SPEECH ENCODING METHOD BASED ON INTERNET PROTOCOL

(75) Inventors: Shengxi Pan, Shenzhen (CN); Yingtao Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 10/366,931

(22) Filed: Feb. 19, 2003

(65) Prior Publication Data

US 2003/0182127 A1 Sep. 25, 2003

Related U.S. Application Data

(63) Continuation of application No. PCT/CN01/00964, filed on Jun. 12, 2001.

(30) Foreign Application Priority Data

Aug. 19, 2000 (CN) .......................... 00126112 A

(51) Int. Cl.[7] .............................................. G10L 19/14
(52) U.S. Cl. ....................... 704/211; 704/220; 704/223; 395/2.66; 370/352; 709/238
(58) Field of Search ........................... 704/270.12, 219, 704/207, 222, 228, 223, 211, 212, 220; 395/2.66; 370/352; 709/238

(56) References Cited

U.S. PATENT DOCUMENTS 5,677,992 A  *  10/1997  Lyberg ...................... 704/257
5,684,922 A  *  11/1997  Miyakawa et al. .......... 704/229
5,933,803 A  *  8/1999  Ojala .......................... 704/223
6,366,961 B1  *  4/2002  Subbiah et al. ............. 709/238
6,456,967 B1  *  9/2002  Yeom ......................... 704/220
6,785,261 B1  *  8/2004  Schuster et al. ............ 370/352

FOREIGN PATENT DOCUMENTS

| WO | 1231555 A | 9/1999 |
| WO | WO 9948223 A1 | 9/1999 |
| WO | WO 0035162 A1 | 6/2000 |
| WO | WO 9950828 A1 | 9/2000 |

* cited by examiner

Primary Examiner—David L. Ometz
Assistant Examiner—Jakieda R Jackson
(74) Attorney, Agent, or Firm—Bacon & Thomas, PLLC

(57) ABSTRACT

A low speed encoding method based on Internet protocol (IP) includes the steps of determining speech characteristic parameters in TN duration, determining an optimized frame length T for successive speech data processing according to the characteristic parameters, making compressed encoding of the speech data in every T, assembling a packet of the encoded bits with TCP and UDP, again assembling a packet of the assembled bits with IP, and finally outputting the channel. The method uses a single frame, variable length frame, intra-frame adaptive low speed speech encoding method, which has the advantages of reducing the bit rate and raising transmission efficiency. The method takes an optimized length encoded frame as a unit to break the IP datagram, and therefore raises encoding and decoding quality of the speech data greatly. Informal tests show that the method can raise a MOS (mean opinion score) value from 0.1 to 0.2.

4 Claims, 4 Drawing Sheets

LOW SPEED SPEECH ENCODING METHOD BASED ON INTERNET PROTOCOL

This application is a continuation of International Application PCT/CN01/00964, filed Jun. 12, 2001, of which the entire disclosure of the pending, prior application is hereby incorporated by reference.

FIELD OF THE TECHNOLOGY

The invention relates generally to a digital encoding method in a digital communication technology, and more particularly to a low speed speech encoding method for speech data based on the Internet protocol (IP).

BACKGROUND OF THE INVENTION

In a digital communication system, the transmission channel bandwidth is always limited. In order to increase system capacity or number of users as much as possible within the limited bandwidth, it is necessary to raise the channel bandwidth utilization. One of the important ways of doing so is by using a low speed speech encoding method to compress the source data. At present, the low speed speech encoding method is based on a fixed frame length. Based on the Internet protocol (IP) transmission, the data context of a speech signal is broken into one speech frame or multiple speech frames with a fixed bit number.

The working procedure, including transmitting and receiving, of a single frame or multiple frames with fixed length is as follows. At the transmitting end, first determine speech characteristics of an inputted speech signal with pulse code modulation (PCM). Then, determine encoding bit rate according to the characteristics of the inputted speech signal and the frame length and make compressed encoding. Finally, the compressed encoded single frame or multiple frames of the speech signal are assembled into TCP packets based on the transport control protocol (TCP) or UDP packets based on the user datagram protocol (UDP) and TCP packets or UDP packets are assembled into IP packets based on the Internet protocol (IP). The IP packets are sent to the receiving end through channels. At the receiving end, fist the packet is disassembled based on the IP, and then on the TCP or the UDP. Then, whether the packet contains an error or delay, and whether there are packets lost, are adjudged. If there is no such abnormal situation, then the packet is normally decoded and recovered to a speech signal with PCM to output. Otherwise, the speech signal with PCM is outputted after a pre-decoding of a signal frame or multiple frames.

In the above procedure, no matter whether an IP packet is a single frame or a multiple frame packet, since a fixed frame length is used, the encoding efficiency is low, and it is difficult to decrease the bit rate further. Furthermore, when an IP packet is a multiple frame packet, in situations of packet error, loss and delay, it is difficult to make any processing for signal decoding.

SUMMARY OF THE INVENTION

The purpose of the invention is to provide a low speed speech encoding method based on the Internet protocol (IP) for solving the technical problems mentioned above. The low speed speech encoding method, provided by the invention, has the benefit of raising encoding efficiency, reducing compressed bit rate, and guaranteeing speech decoding quality.

The technical scheme for implementing the purpose of the invention is that a low speed speech encoding method based on IP, comprises the following steps:

(1) A speech signal, at the signal source, is sampled and quantized to a speech data, which is then inputted sequentially according to the sampling rate;

(2) Determine fundamental tone characteristic parameters of the speech data according to the inputted speech data in TN duration;

(3) Determine an optimized frame length T for subsequent speech data processing according to the fundamental tone characteristic parameters obtained in step (2);

(4) Make compressed encoding for the speech data in every optimized frame length T;

(5) For speech data bits of every optimized length frame, first, assembling packet with TCP or UDP, then assembling packet with IP and finally outputting the packet.

The invention uses a single frame, variable frame length and intra-frame adaptive low speed speech encoding method, which has the benefit of raising compression of the encoding and, therefore, increasing transmission efficiency. Since an IP datagram is broken by an optimized frame length, the quality of encoding and decoding can be greatly raised.

The characteristic of the invention that a variable frame length is used for speech data compressed encoding, which has the benefit of raising the compression ratio of encoding and, therefore, raising transmission efficiency of speech data. At the same time, by using variable length frame and single frame encoding, IP packet error, loss and delay, can be dealt with at decoding. Therefore, the invention is advantageous for decoding quality of speech data. Informal tests show that under the same code error rate and the same compression ratio, the invention can increase an MOS (mean opinion score) value from 0.1 to 0.2.

EMBODIMENTS OF THE INVENTION

The invention, a low speed speech encoding method based on Internet protocol (IP), will be described in more detail, hereinafter, with reference to the drawings and embodiments.

The principles of the method of the invention will be described with reference to FIG. 1 and FIG. 2.

Figure 1:
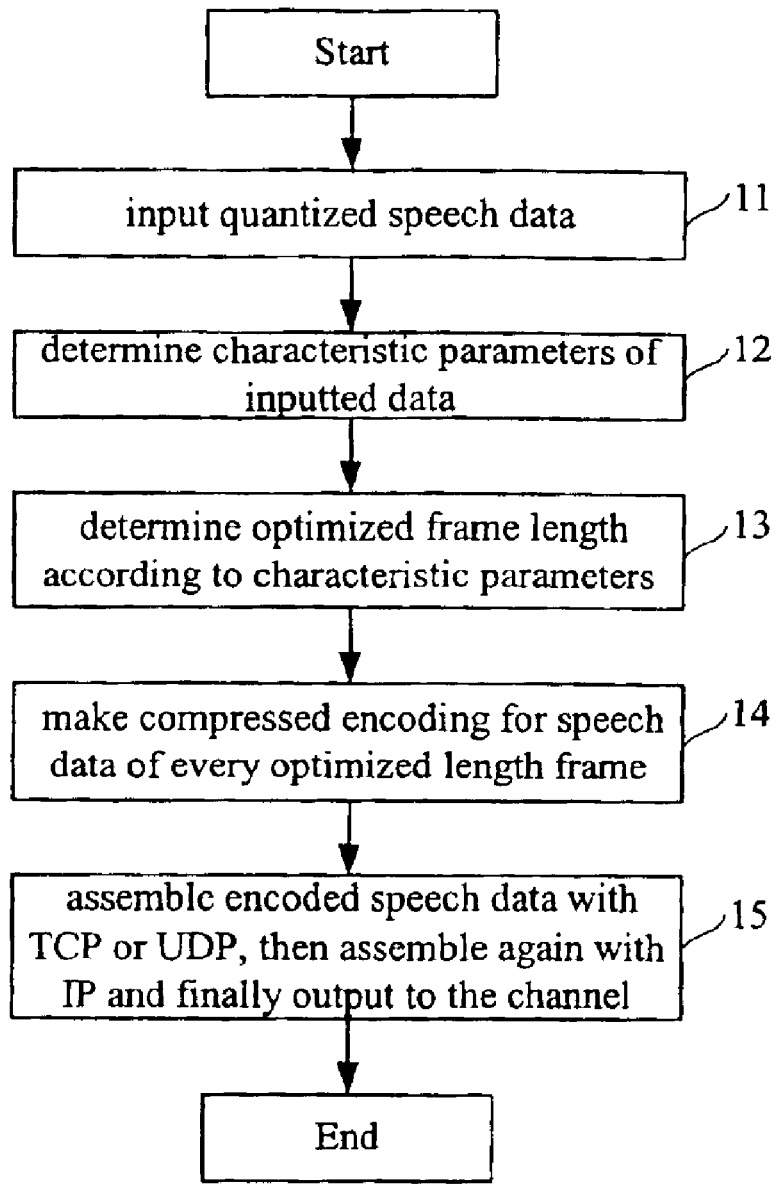
FIG. 1 shows a main flowchart of the encoding method of the invention.

The main steps of the invention method, shown in FIG. 1, are as follows:

In step 11, input speech data that has been quantized;

In step 12, determine characteristic parameters of the inputted speech data;

In step 13, determine an optimized frame length according to the characteristic parameters of the speech data;

In step 14, make compressed encoding for the inputted speech data, based on the optimized frame length.

In step 15, for the compressed encoding speech data, make TCP packet or UDP packet assembling, and then make the IP packet assembling and finally output to the channel.

Figure 2:
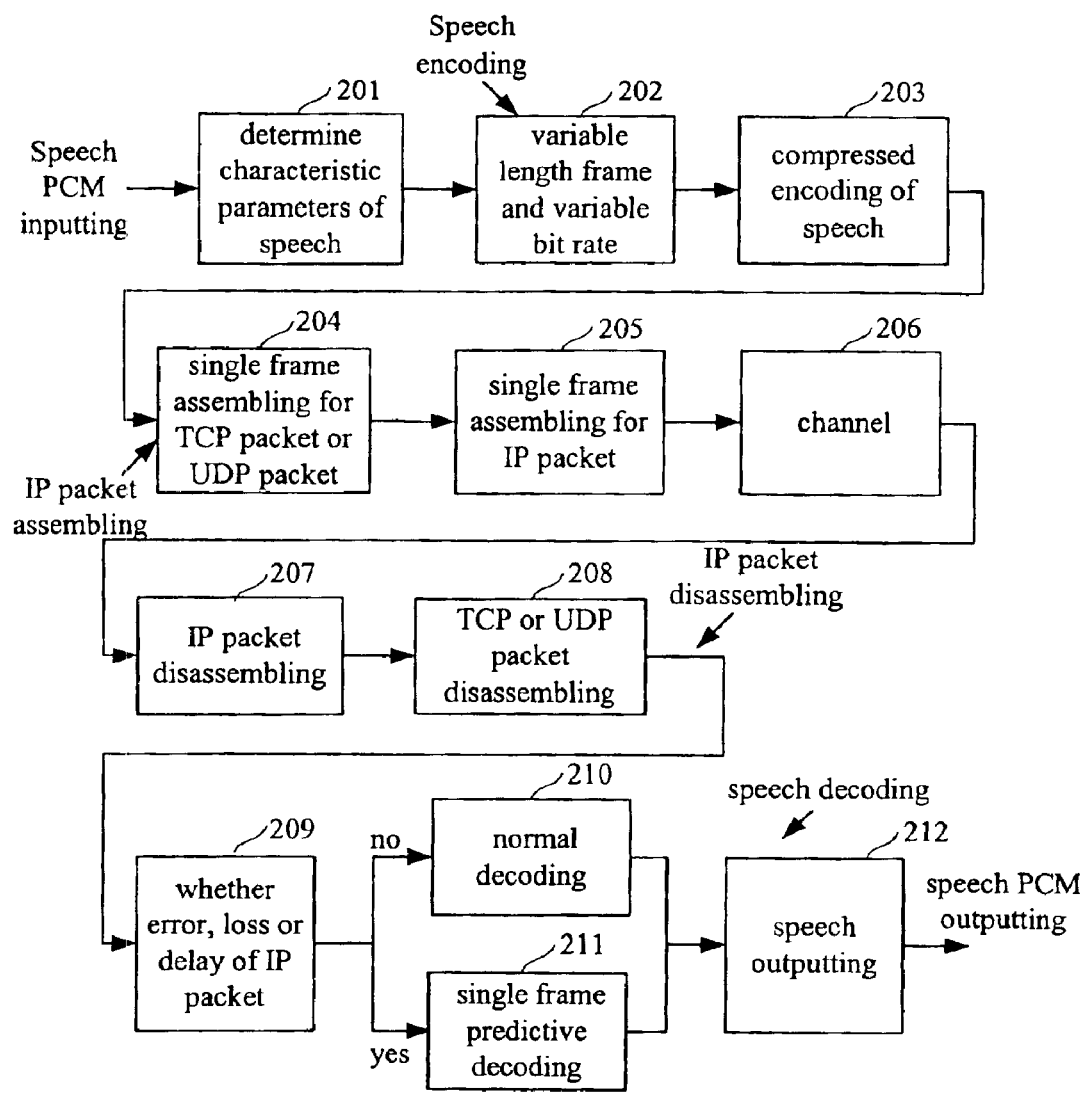
FIG. 2 shows a flowchart of a single frame IP speech transmission system based on adaptive variable frame length and variable bit rate.

In FIG. 2, a PCM signal source is connected with the speech characteristics determining module 201, and sends quantized speech data to the module 201. The speech data is sequentially inputted according to the sampling rate during the PCM quantization. The speech determining module 201 determines the characteristic parameters of the speech data inputted at duration (TN ms). Length of the duration is determined by the following: first, it is necessary to keep the compressed encoding efficiency as high as possible; second, the duration cannot be too long. Experience shows that it is optimized for 5 ms≦TN≦30 ms. The variable length frame and variable bit rate module 202 determines an optimized frame length (T) for the subsequent processing of the inputted speech data according to the speech characteristic parameters, e.g., the degree of change of the speech. The basic principles to determine the optimized frame length are as follows: under the condition that inputted speech characteristics are unchanged during a short duration, the speech data is broken into frames with a length as long as possible. Specifically speaking, if the speech frequency is fast, then the frame length is shorter, otherwise it is longer. Therefore, within duration TN, the possible optimized frame length T is: T=T1, T2 . . . TN, a limited set. The speech compressed encoding module 203 encodes speech data of each optimized length (T) frame with the intra-frame variable bit rate algorithm and outputs the encoded NUM bits. Within duration TN, encoded NUM bits of every frame with optimized length also constitute a limited set, expressed as NUM= NUM1, NUM2 . . . NUMM. The signal frame assembling module for TCP packet or UDP packet 204 adds the TCP or UDP packet head to the encoded NUM bits of each optimized length frame, expressed as NUM_P. The single frame assembling module for IP packet 205 adds route information to NUM_P to form NUM_IP bits speech data for every frame and sends the data to the receiving end through the channel 206.

At the receiving end, first, the disassembling module for IP packet 207 disassembles the NUM_IP bits speech data. Then, the output of module 207 is again disassembled by the disassembling module 208 for the TCP packet or UDP packet. In a normal situation, the speech data decoding module 210 makes a decoding normally. However, during transmission, an error code or transmission delay etc. may happen because of the quality of the channel etc. In these cases, if module 209 has checked that there is a packet error, loss or delay, the single frame predictive decoding module 211 carries out decoding. Since there is only one frame transmission, it is easy for the speech data decoding module to deal with the abnormal situations. Finally, the speech data output module 212 recovers PCM speech data to output.

In summary the working principle and flow shown in FIG. 1 and FIG. 2 include speech encoding and packet assembling based on IP at the transmitting end and packet disassembling based on IP and speech decoding at the receiving end.

The basic operation steps for speech encoding and packet assembling are:

(1) A sampled and quantized speech data is inputted with the sampling sequence;

(2) A speech characteristics determining module determines speech characteristic parameters according to the inputted speech data at every TN ms duration. Then, according to the characteristic parameters of the speech data, i.e., the degree of change of the speech, an optimized length T of a frame for subsequent speech processing is determined For the limited set T=T1, T2 . . . TN;

(3) The speech data within the optimized length frame is encoded with the intraframe variable bit rate algorithm, and the encoded NUM bits of every optimized length frame are outputted. The NUM is also a limited set, NUM=NUM1, NUM2 . . . NUMM;

(4) The encoded NUM bits are added with packet head of TCP or UDP to form a NUM_P bits for every optimized length frame;

(5) The NUM_P bits are added with packed head of IP, which includes route information, to form a NUM_IP bits for every optimized length frame;

(6) The NUM_IP bits for every optimized length frame are sent to the receiving end through the channel.

The basic operation steps for IP packet disassembling and decoding are:

(1) First, the received packet is disassembled with IP by the receiving end;

(2) Then, the disassembled packet is again disassembled with TCP or UDP;

(3) Under normal situation, the speech decoding module decodes in a normal fashion;

(4) Under abnormal situation, decoding is carried out by a single frame predictive decoding module;

(5) The recovered speech data are outputted.

The invention, a variable length frame and variable bit rate encoding method, can be used in IP speech transmission via a public network and private network on the Internet network. The invention also can be used in future mobile communication for speech transmission based on the IP core network.

Figure 3:
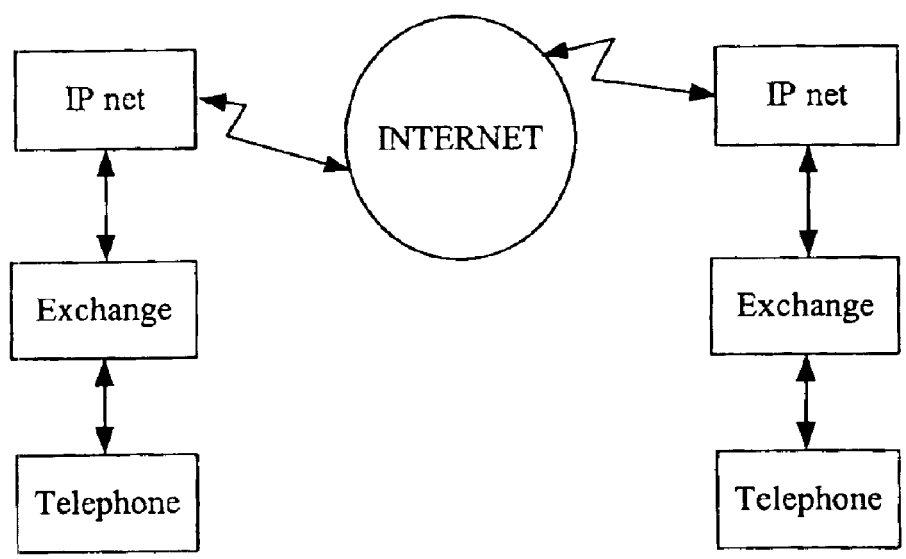
FIG. 3 shows a logical structure diagram of an embodiment communication system with the encoding method of the invention.

FIG. 3 shows IP speech transmission over a public telephone network on the Internet network, wherein the IP gateway uses the variable length frame and variable bit rate encoding method proposed by the invention. When an IP packet is transferred on the Internet network, if there is packet loss or error, the decoder can correct the decoding deviation according to the invention. Since the transmission is in a variable length frame, so there is a better correction quality for speech decoding.

Figure 4:
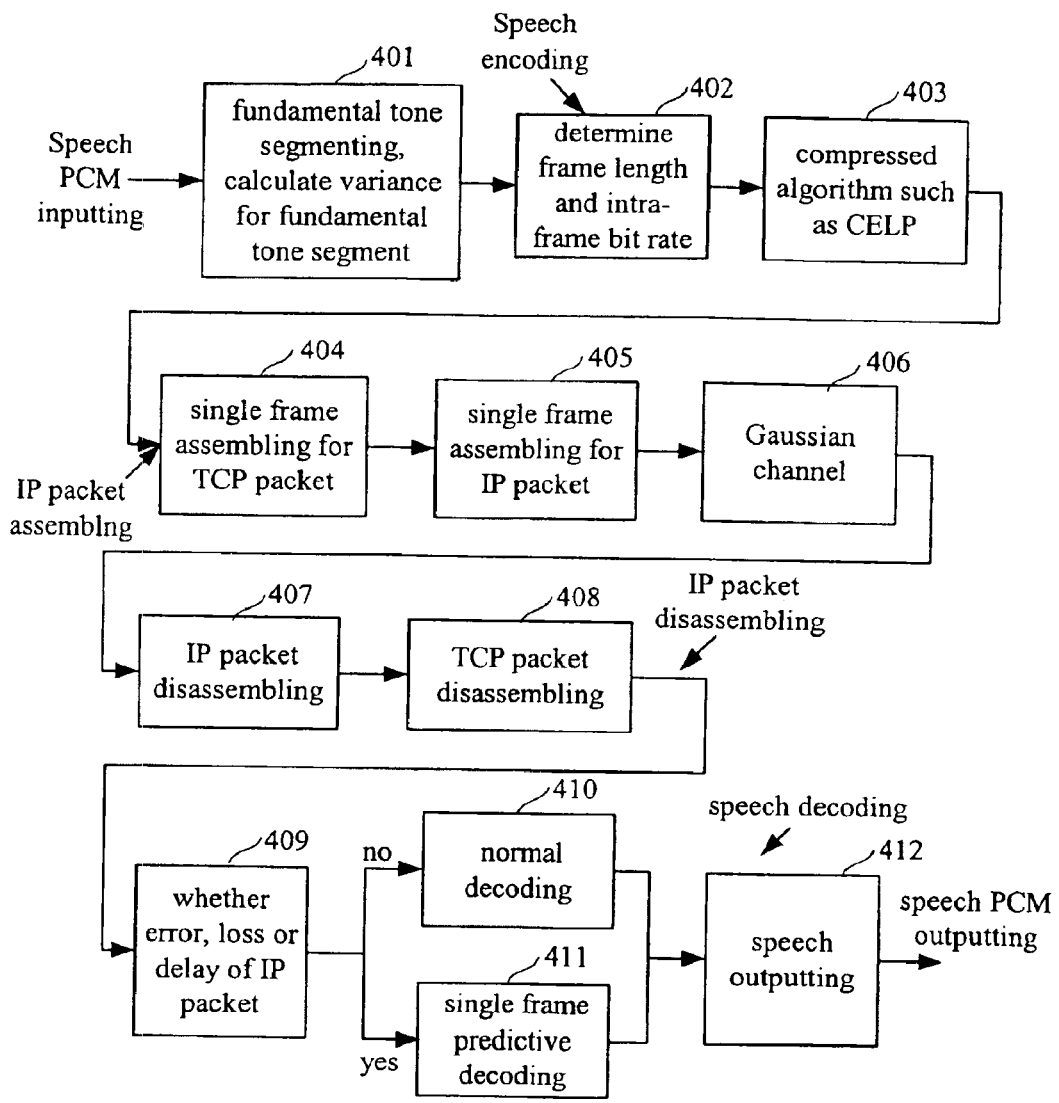
FIG. 4 shows an embodiment flowchart of a single frame IP speech transmission system based on adaptive variable frame length and variable bit rate.

Referring to FIG. 4, there is an embodiment of a variable length frame and variable bit rate encoding method for the IP gateway. The encoding bit rates are 2 kbit/s, 4 kbit/s and 8 kbit/s. The basic operation steps are shown below.

Steps 401, 402, 403, 404, 405 and 406 constitute the speech encoding and IP packet assembling part.

(1) The input signal is sampled and quantized speech data with sampling rate 8000 Hz and is inputted according to the sampling sequence. The optimized length frame T is that T1=5 ms, T2=10 ms, T3=15 ms, T4=20 ms, T5=25 ms and T6=30 ms.

(2) The speech characteristics determination module determines the speech characteristic parameters according to the inputted data of every 30 ms duration (TN=30 ms). The calculation method is as follows: taking 5 ms as a fundamental tone period, and calculating, respectively, the variance D10, D15, D20, D25 and D30 of the fundamental tone periods 10 ms, 15 ms, 20 ms, 25 ms and 30 ms (step 401).

(3) The optimized frame length T and intra-frame variable bit rate, used for subsequent processing of the inputted speech data, are determined according to characteristic parameters of the speech data, i.e., the degree of change of the speech. The infra-frame bit rate can be determined by the speech characteristics. Suppose the vowel code is with more bits and the consonant is with less bits, (step 402):

When D30<Threshold, then T=30;

When D25<Threshold, then T=25;

When D20<Threshold, then T=20;
When D15<Threshold, then T=15;
When D10<Threshold, then T=10;
Otherwise T=5;
where the Threshold is a comparative value of the variance for the fundamental tone period. The Threshold is a compromise of encoding efficiency and encoding quality.

(4) The speech data of an optimized frame length T is compressed and encoded with an intra-frame variable bit rate algorithm, such as code excited linear prediction (CELP) etc. The number of bits for every encoded optimized length frame is NUM (step 403). There are three levels of NUM: T*2, T*4 and T*8.

(5) The NUM bits of an optimized length frame are assembled with a TCP packet head, and the number of bits of every optimized length frame is now changed to NUM_P bits (step 404).

(6) The NUM_P bits is again assembled by the signal frame assembling module for the IP packet, supplemented with route information and changed to NUM_IP bits for every optimized length frame (step 405). The NUM_IP bits of every optimized length frame are transmitted to the receiving end through a Gaussian channel (step 406).

Steps 407, 408, 409, 410, 411 and 412 constitute the IP packet disassembling and speech decoding part.

(1) The receiving end disassembles an IP packet (step 407).

(2) The resulting TCP packet is disassembled.

(3) In a normal situation, the speech decoding module makes normal decoding (step 410).

(4) In an abnormal situation, such as packet error, loss or delay (step 409), a single frame pre-decoding is made (step 411).

(5) Output a recovered PCM speech data (step 412).

The invention is a low speed speech encoding method based on the TCP/IP protocol. Through a single frame, variable frame length and intra-frame adaptive encoding, a compressed encoding can be obtained, so transmission efficiency of the speech data is further raised. Moreover, an IP datagram is broken by every optimized length frame, resulting in the benefit of increasing quality of speech encoding and decoding.

What is claimed is:

1. A low speed speech encoding method based on Internet protocol (IP), comprising:

(1) according to the sampling rate, sequentially inputting speech data obtained by sampling and quantizing a speech signal;

(2) in a duration (TN), wherein TN=30 ms, determining fundamental tone characteristic parameters according to inputted speech data as follows:
   taking 5 ms as a fundamental tone period, and respectively calculating the variance D10, D15, D20, D25, and D30 of the fundamental tone periods, 10 ms, 20 ms, 25 ms, and 30 ms;

(3) determining an optimized frame length (T) for subsequent processing of speech data according to the fundamental tone characteristic parameters obtained at step (2) as follows:
   when D30<Threshold, then T=30;
   when D25<Threshold, then T=25;
   when D20<Threshold, then T=20;
   when D15<Threshold, then T=15;
   when D10<Threshold, then T=10;
   otherwise T=5,
   where the Threshold is a comparative value of the variance for the fundamental tone period and represents a compromise between encoding efficiency and encoding quality;

(4) making compressed encoding for speech data in every frame with the optimized frame length (T); and (5) for compressed encoded speech data bits of every optimized length frame, first, assembling a packet with TCP protocol or UDP protocol, the assembling the packet with IP protocol, and finally outputting the packet assembled with TCP or UDP and IP protocols.

2. The method according to claim 1, wherein the step of making compressed encoding for speech data in every frame with the optimized length (T), uses an intra-frame variable bit rate algorithm.

3. The method according to claim 1, wherein the optimized frame length (T) is a limited set of the duration (TN), where T=T1 or T2 . . . or TN.

4. The method according to claim 1, wherein the duration (TN), a bits number NUM of compressed encoded speech data for every optimized length frame is a limited set of NUMM, NUM=NUM1 or NUM2 . . . or NUMM.

* * * * *